March 8, 1960  F. FOERSTER  2,928,043
MEASURING AND TESTING INSTRUMENTS
Original Filed Nov. 15, 1952  3 Sheets-Sheet 1

Inventor
FRIEDRICH FOERSTER by Hill, Sherman, Meroni, Gross & Simpson
Attys.

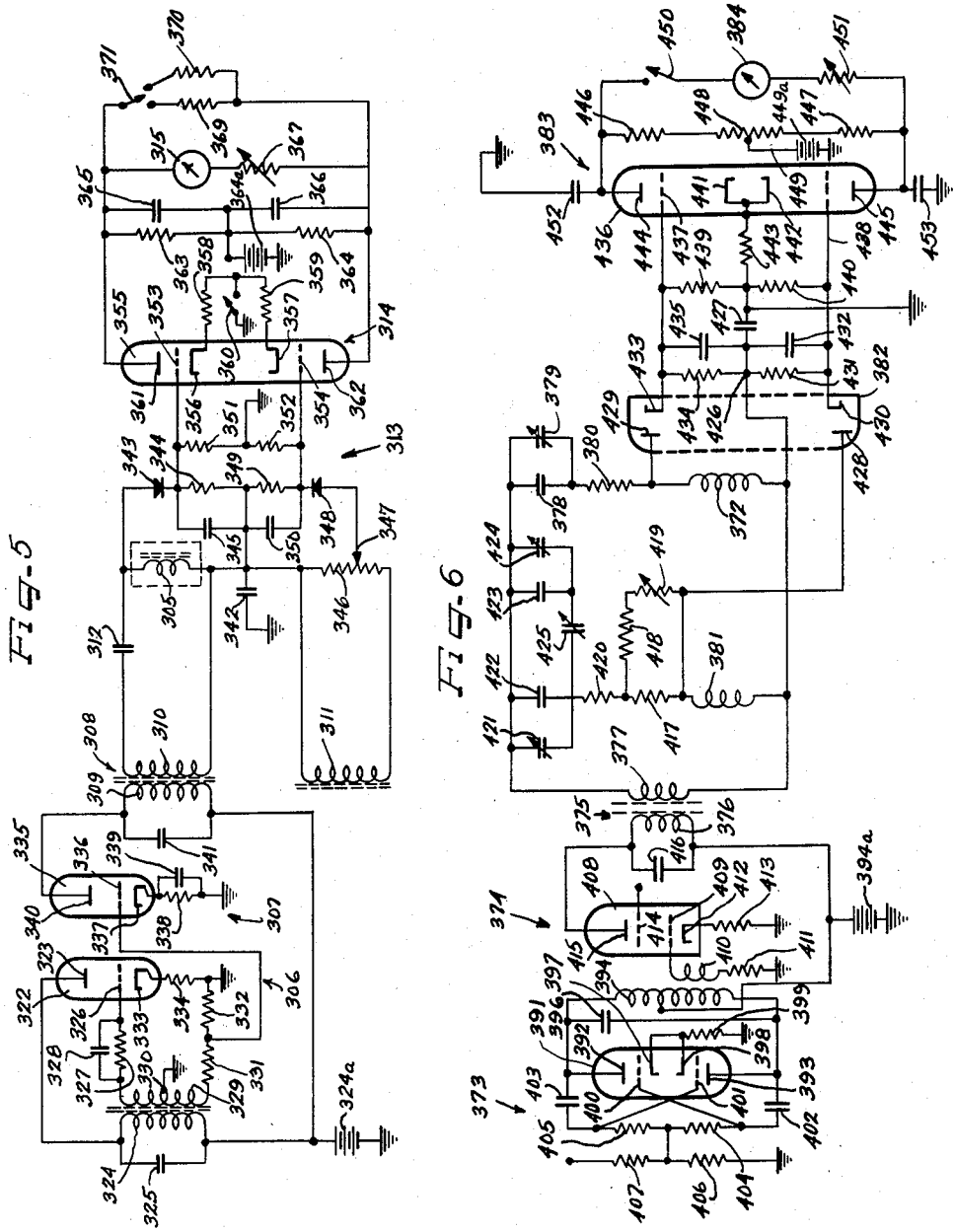

Inventor
FRIEDRICH FOERSTER

United States Patent Office 2,928,043
Patented Mar. 8, 1960

2,928,043

MEASURING AND TESTING INSTRUMENTS

Friedrich Foerster, Reutlinger, Germany

Original application November 15, 1952, Serial No. 320,739, now Patent No. 2,806,992, dated September 17, 1957. Divided and this application August 7, 1957, Serial No. 676,864

4 Claims. (Cl. 324—34)

This invention relates to methods and apparatus for testing and more particularly to methods and apparatus for testing in which a change in one characteristic of a structure under test may be indicated independently and irrespective of changes in other and different characteristics.

This application is a division of my copending application entitled "Measuring and Testing Instruments," filed November 15, 1952, U.S. Serial No. 320,739, now Patent No. 2,806,992.

It is known that changes in the physical character of a structure may change the electrical loading effect on an alternating current excited coil placed in proximity to the structure. Instruments have heretofore been provided for testing for changes in electrical load, that is, changes in effective resistance of a coil, to detect changes in the physical character of a structure. Such instruments have not been entirely successful, however, because the actual effect of a change in character of the structure on the electrical characteristics of the coil has not been realized or considered. In many cases, the instruments have given indication of a change in one characteristic of the structure under test when that characteristic had not changed at all and the indication was actually due to a change in an entirely different characteristic from that tested for.

According to this invention, a change in only one characteristic is tested for and indicated irrespective of and independently from changes in other and different characteristics. This is accomplished through an alternating current excited test coil loaded by the structure under test with means for detecting changes in only a certain characteristic of the structure from the electrical effect on the coil.

Through testing of the effect on inductive reactance and resistance of a coil as produced by various changes in the physical character of an article and in the physical relation of the coil to the article, it has been discovered that the relative effect upon inductive reactance and resistance is different for changes in different characteristics and that for a change in only one characteristic of the structure, the change in inductive reactance of the coil will be a certain function of the associated change in effective resistance.

According to a particular feature of this invention, an alternating current excited test coil is placed in proximity to a structure to be tested, the coil having an inductive reactance varying according to a certain function of the resistance with changes in a certain characteristic of the structure under test and means are provided for producing a particular indication when and only when the inductive reactance varies with the resistance according to that particular function.

In a preferred embodiment of the invention, a capacitor is connected in series with the test coil and forms with the test coil a resonant circuit and means are provided for measuring and indicating the voltage developed across the test coil. It has been discovered that if the resonant frequency of the circuit is greater than the frequency of the alternating current applied to the coil, a change in one characteristic of the structure under test will change the magnitude of the voltage across the coil while a change in another and different characteristic of the structure under test will have no effect on the magnitude of the voltage across the coil. With this arrangement, accordingly, a change in the one characteristic of the structure under test may be indicated separately and independently from a change in the other characteristic. With the resonant frequency of the circuit less than the frequency of the alternating current applied to the coil, the reverse effect takes place.

It is an object of this invention, accordingly, to provide improved methods and apparatus for electrically testing for changes in particular physical characteristics of structures.

A more specific object of this invention is to provide improved methods and means for testing for changes in the physical character of structures by which a change in one physical characteristic may be indicated and measured independently and irrespective of changes in other and different physical characteristics.

This invention contemplates other objects, features and advantages which will become more fully apparent from the following detailed description taken in conjunction with the accompanying drawings which illustrate preferred embodiments and in which:

Figure 5 is a circuit diagram of one preferred application of the invention in which a meter or a calibrated dial is used as an indicator with a change in one physical characteristic of the structure under test producing no change in the indication while a change in another physical character of the structure will produce a change in the indication;

Figure 6 is a circuit diagram of a still further application of the invention which is very similar to the arrangement of Figure 5 but with a reverse operation;

Figure 1:
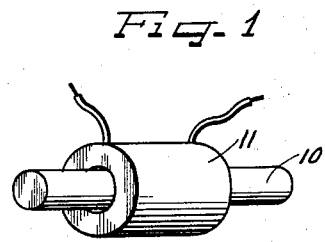
Figure 1 is a perspective view of one test coil arrangement in which a cylindrical article under test is placed inside the test coil.
Figure 2:
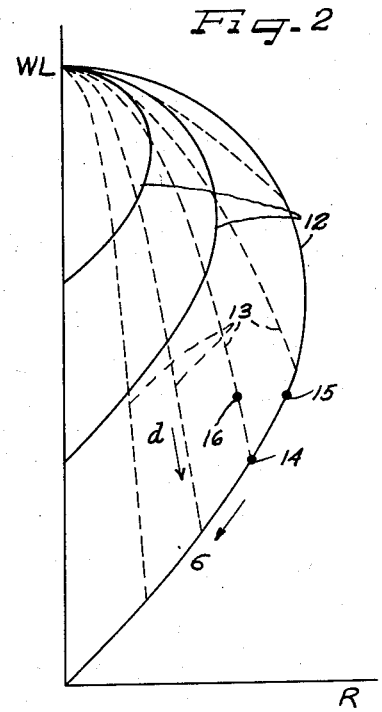
Figure 2 is a graph illustrating the relative changes in inductive reactance and resistance with changes in certain physical characteristics of the article under test in Figure 1 with respect to the test coil.

Reference numeral 10 in Figure 1 designates a generally cylindrical test piece of conductive material which is placed inside a solenoid test coil 11. Figure 2 is a graphic illustration of the relative changes in inductive reactance and resistance with changes in the physical character of the test piece 10 and its relation to the test coil 11. The solid lines 12 in the graph illustrate changes in inductive reactance and resistance with the diameter of the test piece 10 constant for each of the solid lines, the conductivity of the test piece 10 being varied. The dotted lines 13 illustrate the changes in inductive reactance and resistance which take place when the conductivity of the test piece 10 is maintained constant but the diameter of the test piece 10 relative to the inside diameter of the test coil 11 varied.

With a test piece 10 having a given diameter and a given conductivity, the inductive reactance and resistance of the test coil 11 might, for example, be at a point such as indicated by reference numeral 14 on the graph of Figure 2. If a test piece having the same diameter but a different material so as to have less conductivity were then placed in the test coil 11, the test coil might have an inductive reactance and resistance as represented by reference numeral 15 in the graph of Figure 2. With a test piece of the same material and of the same conductivity but with a smaller diameter, on the other hand, the inductive reactance and resistance would be changed along a dotted line to values as represented by the point 16 on the graph of Figure 2.

It might here be noted that a narrow crack or defect in the test piece produces a change in inductive reactance and resistance the same as if the conductivity of the test piece were changed. Thus the changes in inductive reactance and resistance produced by a change in diameter is very different from the changes produced by a crack or the like defect. It will, accordingly, be appreciated that either a change in diameter or a change in conductivity as might be produced by a defect may be indicated independently and irrespective of a variation or change in the other.

Figure 3:
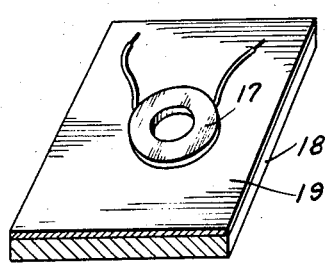
Figure 3 is a perspective view of another test coil arrangement in which the test coil is placed against a structure under test.

Figure 3 is a perspective view of another test coil arrangement in which a coil 17 is placed flat against a test piece 18 with the axis of the test coil 17 normal to the surface of the test piece 18. With this arrangement, the inductive reactance and effective resistance of the test coil 17 may vary according to the graph of Figure 4.

Figure 4:
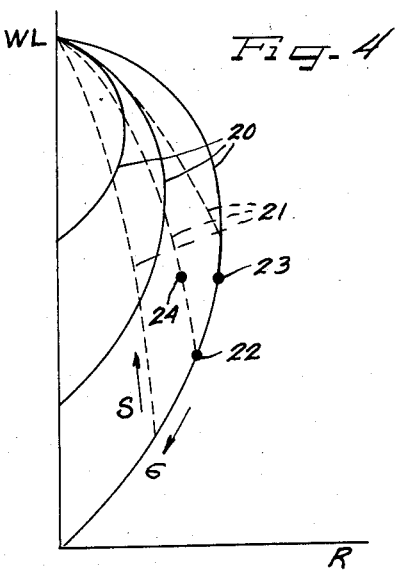
Figure 4 is a graph illustrating the relative changes in inductive reactance and resistance for changes in the physical character of the test piece and its physical relation to the test coil in the arrangement of Figure 3.

If the spacing between the coil 17 and the test piece 18 should be a constant value, that is, if the thickness of a non-conductive coating 19 on the test piece 18 should be a constant value, the inductive reactance and resistance of the test coil will vary along the solid lines 20 in the graph of Figure 4. If, on the other hand, the conductivity of the test piece 18 is constant and the spacing between the test coil 17 and the test piece 18 varied as by changing the thickness of the coating 19, then the inductive reactance and resistance will vary along the dotted lines 21 in the graph of Figure 4.

For example, with a test piece 18 having a given conductivity and with a given thickness of the coating 19, the inductive reactance and resistance of the test coil might be as represented by the point 22 in the graph of Figure 4. If the conductivity of the test piece 18 were then decreased, the inductive reactance and resistance of the test coil 17 might be changed to values as represented by point 23 in the graph of Figure 4. On the other hand, if the spacing between the test coil 17 and the test piece 18 were decreased as by increasing the thickness of the coating 19, the inductive reactance and resistance of the test coil 17 might be changed to values as determined by the point 24 in the graph of Figure 4.

As in the case of the arrangement of Figures 1 and 2, a narrow crack or defect in the test piece 18 of the arrangement of Figures 3 and 4 will have substantially the same effect as a decrease in conductivity.

In addition to the spacing between the test coil 17 and the test piece 18 and the conductivity of the test piece 18, there is another variable which may affect the inductive reactance and resistance of the test coil 17. That variable is the thickness of the test piece 18 which will produce a change in inductive reactance and resistance entirely different from the changes produced by changes in spacing and conductivity. This is not illustrated in Figure 4 but it will be understood that, if desired, the thickness of a test piece 18 might be measured independently of other variations according to the principles of this invention.

Figure 5 is a circuit diagram of one preferred form of instrument according to this invention. This instrument is preferably used to measure the thickness of a non-conductive coating on a conductive base and uses a test coil of a form similar to the test coil 17 of Figure 3. When this probe coil is placed on the coating, it will have an inductive reactance and resistance which is dependent upon the thickness of the coating and the conductivity of the base according, for example to the graph of Figure 4.

The instrument of Figure 5 includes, in general, an oscillator 306 having an alternating current output amplified by an amplifier 307 which has an output transformer 308 having one primary winding 309 and two secondary windings 310 and 311. The probe or test coil 305 is connected in series with a capacitor 312 to the secondary 310. The voltage appearing across the test coil 305 will depend upon the loading of the same.

To measure the voltage across the test coil 305, it is balanced against the voltage across the secondary 311 which is hence used as a reference voltage. The two voltages are fed to a bridge detector circuit generally designated by reference numeral 313 which produces two direct current output voltages corresponding to the alternating voltages across the test coil 305 and the secondary 311 and of opposite polarity. These direct voltages are applied through a direct current amplifier generally designated by reference numeral 314 to a meter 315 which indicates the difference between the reference voltage across the secondary 311 and the voltage across the test coil 305.

A highly important feature of this instrument is in the operation of it in a manner such that it is highly sensitive to differences in the thickness of the non-conductive coating but is insensitive, within practical limits, to changes in the conductivity of the conductive material. This feature will be best understood by first referring to Figure 4 which, as described above, shows the variance of inductive reactance and resistance of the test coil 17 with variations in the thickness of the coating 19 and with variations in the conductivity of the base 18 and with reference to Figure 7 which is a graph illustrating the voltage across an inductance in a series resonant circuit with changes in inductive reactance and resistance.

Figure 7:
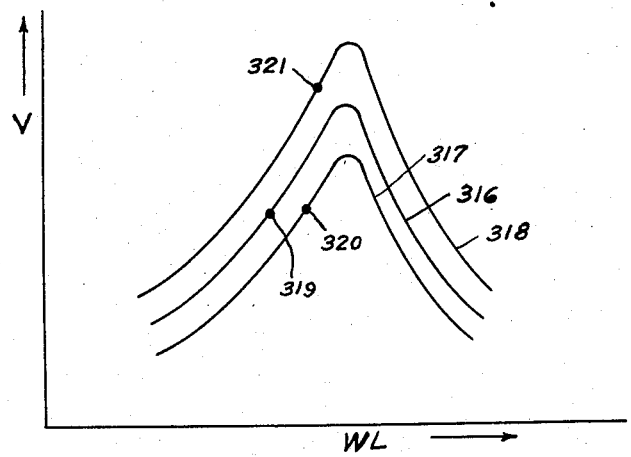
Figure 7 is a graph illustrating the operation of the arrangement of Figure 5.

As described above in connection with Figures 3 and 4, point 22 in the graph of Figure 4 represents the inductive reactance and resistance for a test piece having a given conductivity and a coating of given thickness. Point 23 in the graph represents the inductive reactance and resistance with a change in the conductivity only of the test piece, while point 24 represents the inductive reactance and resistance with a change in the thickness only of the coating. In Figure 7, curve 316 is a plot of the voltage across the test coil 305 with changing inductive reactance and with a constant resistance equal to the resistance as represented by point 22 on the graph of Figure 4. Curve 317 is obtained with a resistance as represented by point 23 in the graph of Figure 4 and curve 318 is obtained with a resistance as represented by point 24 in the graph of Figure 4. Point 319 on curve 316 is the point of operation in the graph of Figure 7 when the inductive reactance and resistance are as represented by point 22 in the graph of Figure 4. Point 320 on curve 317 is the point of operation in the graph of Figure 7 when the inductive reactance and resistance are as represented by point 23 in the graph of Figure 4 and point 321 on curve 318 is the point of operation with the inductive reactance and resistance as represented by point 24 in the graph of Figure 4.

It will be noted that with a change in inductive reactance and resistance from point 22 to point 23 in Figure 4 caused by a change in the conductivity, only, of the test piece, the point of operation in Figure 7 will be changed from point 319 to 320 and the voltage across the test coil will not be changed. However, with a change in inductive reactance and resistance from point 22 to point 24 in the graph of Figure 4, as caused by a change in thickness, only, of the coating, the point of operation in Figure 7 will be changed from point 319 to 321 and a large change in the voltage across the probe coil will result. Accordingly, by operating the instrument of Figure 5 at a frequency below the resonant frequency of the resonant circuit including capacitor 312 and test coil 305, the instrument is insensitive to changes in conductivity of the base but is very sensitive to changes in the thickness of the coating on the base. The meter 315 may, if desired, be calibrated to read the thickness of a coating directly and the reading obtained will not be changed by changes in conductivity due to changes in the nature of the base or the presence of small cracks or defects in the base. In the alternative, the reference voltage may be adjusted to obtain a null in the meter 315 and the means used to adjust the reference voltage may be calibrated to read in units of coating thickness.

In more detail, the oscillator circuit 306 of the instrument of Figure 5 comprises a triode vacuum tube 322 having a plate 323 connected through transformer primary 324 to a source of high positive potential with respect to ground, such as battery 324a, with a capacitor 325 provided to tune the transformer primary 324 to resonance at the desired operating frequency of the instrument, a grid 326 connected through a grid leak resistor 327 in parallel with a grid leak capacitor 328 to one end of a transformer secondary 329 inductively coupled to the primary 324 and having a center tap 330 connected to ground and having the other end connected to ground through series connected resistors 331 and 332, and a cathode 333 connected through a bias resistor 334 to ground. In essence, this circuit is similar to the conventional Hartley oscillator circuit. The output of the circuit appears at the junction between the resistors 331 and 332.

The amplifier 307 comprises a triode vacuum 335 having a grid 336 connected to the output of the oscillator stage 306 at the junction between resistors 331 and 332, a cathode 337 connected through a bias resistor 338 to ground with a by-pass capacitor 339 thereacross, and a plate 340 connected to one end of the transformer primary 309, the other end of the primary being connected to a source of high positive potential with respect to ground, such as battery 324a, and a capacitor 341 being connected across the primary 309 to tune the same to resonance at the operating frequency of the instrument.

In the bridge detector circuit generally designated by reference numeral 313, one end of the test coil 305 is connected directly to one end of the transformer secondary 311 and through a by-pass capacitor 342 to ground. The other end of the test coil 305 is connected through a rectifier 343 and through a resistor 344 to the aforementioned one end of the coil 305 with a capacitor 345 connected across the resistor 344.

The transformer secondary 311 is connected to opposite ends of a potentiometer 346 having a movable contact 347 connected through a rectifier 348 and a resistor 349 to the aforementioned one end of the secondary 311, a capacitor 350 being connected across the resistor 349. By these circuits, unidirectional voltages appear across the resistors 344 and 349 in accordance with the alternating voltages across the test coil 305 and the transformer secondary as reduced by adjustment of the potentiometer 346, respectively. The junction between rectifier 343 and resistor 344 and the junction between rectifier 448 and resistor 349 are connected through resistors 351 and 352, respectively, to ground and also to grids 353 and 354 of a twin triode amplifier tube 355 which functions as a direct current amplifier and which has a pair of cathodes 356 and 357 connected respectively through resistors 358 and 359 and through a common switch 360 to ground, and a pair of plates 361 and 362 connected through resistors 363 and 364 to a source of high positive voltage with respect to ground, such as battery 364a, with capacitors 365 and 366 connected respectively across the resistors 363 and 364. The plates 361 and 362 are also connected to the meter 315 with a variable resistor 367 in series with the meter 315 and with resistors 369 and 370 connectible in shunt with the meter 315 and resistor 367 by means of a switch 371. The meter 315 may be thus calibrated by the variable resistor 367 and the resistors 369 and 370 may be used to control the range of the meter.

Figure 6 is a schematic diagram of another preferred form of instrument constructed according to this invention. This instrument is somewhat similar to that of Figure 5 and is preferably used to measure conductivity of a test piece instead of the thickness of a coating as is measured by the instrument of Figure 5. The heart of the instrument is in the probe or test coil 372 which is preferably arranged to be disposed flat against a test piece in the manner similar to the arrangement of coil 17 relative to test piece 18 in Figure 3.

The instrument comprises, in general, an oscillator 373 coupled to an amplifier 374 which has an output transformer 375 having a primary 376 and a secondary 377. The secondary 377 is connected to the test coil 372 through a fixed capacitor 378 in parallel with a variable capacitor 379 in parallel with each other and in series with the probe coil 372 through a resistor 380. The voltage across the probe coil 372 is, of course, dependent upon the loading thereof by the structure under test. This voltage is measured by means of a bridge circuit which provides a reference voltage across an inductance 381. The voltage across the test coil 372 and the reference voltage across the inductance 381 are rectified by a circuit including a twin diode tube 382 to provide unidirectional voltages of opposite polarity, these voltages being amplified by a direct current amplifier 383 and applied to a meter 384 which indicates the difference between the voltage across the test coil 372 and the reference voltage across the inductance 381.

A highly important feature of this instrument is in the operation of the same such that it is highly sensitive to changes in conductivity of the structure under test while it is comparatively insensitive to changes in surface conditions between the test coil and the test piece.

Figure 8:
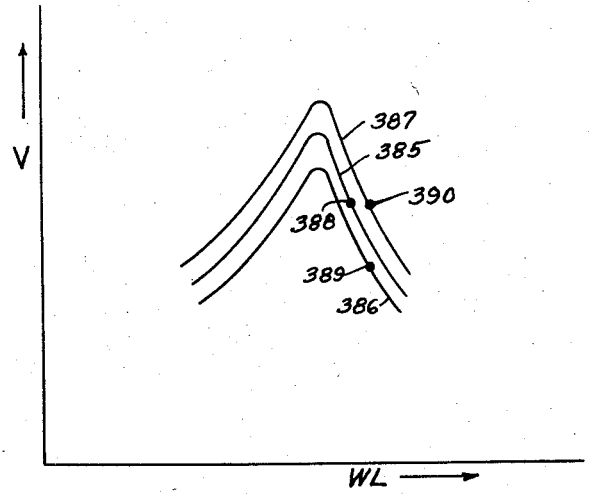
Figure 8 is a graph illustrating the operation of the arrangement of Figure 6.

This feature will be best understood by reference to Figures 3 and 4 which have been described in detail above and by reference to Figure 8 which is similar to Figure 7. Figure 8 is a plot of the voltage developed across the test coil 372 against the inductive reactance in the series circuit with three different values of resistance in the circuit. Curve 385 is obtained with a constant reistance in the series circuit as represented by point 22 in the graph of Figure 4. Curve 386 is obtained with a fixed resistance as represented by point 23 in the graph of Figure 4 and curve 387 is obtained with a fixed resistance in the series circuit as represented by point 24 in the graph of Figure 4.

Point 388 on curve 385 is the point of operation when the inductive reactance and resistance of the test coil are as represented by reference numeral 22 in Figure 4, while point 389 is the point of operation when the inductive reactance and resistance of the test coil are as represented by point 23 in Figure 4 and point 390 is the point of operation when the inductive reactance and resistance are as represented by reference numeral 24 in Figure 4.

It will be noted that when the operation is changed from point 22 to 23 in Figure 4, the point of operation in Figure 8 will be changed from point 388 to 389 and the voltage across the test coil will be greatly reduced. This will take place when there is a change in conductivity, only, of the test piece. With a change in the spacing between the test coil and test piece, on the other hand, the operation will be changed from point 22 to point 24 in Figure 4 and from point 388 to 390 in Figure 8. With this change in spacing, there will be substantially no change in the voltage across the test coil. Hence, with the series circuit resonant at a frequency higher than the frequency of the alternating voltage, the instrument will be very sensitive to changes in conductivity of the structure under test while being comparatively insensitive to changes in the spacing between the coil and the structure under test.

The oscillator 373, in detail, comprises a twin triode vacuum tube 391 which has a pair of plates 392 and 393 connected together through a transformer primary 394 having a center tap 395 connected to a source of high positive potential with respect to ground, such as battery 394a, and a capacitor 396 connected thereacross to tune the same to resonance at the desired operating frequency of the instrument, preferably but not necessarily about 60 kilocycles. The tube 391 also has a pair of cathodes 397 and 398 connected together and to ground through a resistor 399 and a pair of grids 400 and 401 connected through capacitors 402 and 403, respectively, to the plates 393 and 392 and connected together through resistors 404 and 405, the junction between the resistors 404 and 405 being connected to ground through a resistor 406 and to a source of positive potential with respect to ground through a resistor 407. This is hence a push-pull oscillator circuit with feed back from the plate of each triode section of the tube 391 to the grid of the opposite section through the capacitors 402 and 403.

The amplifier 374 comprises a tetrode amplifier tube 408 having a grid 409 connected through a transformer secondary 410 inductively coupled to the primary 394 and through a resistor 411 to ground, a cathode 412 connected through a bias resistor 413 to ground, a screen grid 414 connected to a source of high positive potential with respect to ground, and a plate 415 connected through the primary 376 of the transformer 375 to a source of high positive potential with respect to ground, such as the battery 394a, a capacitor 416 being connected in parallel with the primary 376 to tune the same to resonance at the operating frequency of the instrument.

The inductance 381 across which the reference voltage is obtained is connected in series with the parallel combination of a resistor 417 and series connected resistors 418 and 419, in series with a resistor 420 and in series with a mesh of capacitors including capacitors 421, 422, 423, 424 and 425, the series circuit including the inductance 381 being connected across the secondary 377 of the transformer 375.

One end of the inductance 381 is connected together with one end of the test coil 372 to a junction point 426 which is connected to ground through a by-pass capacitor 427. The other end of the inductance 381 is connected to one plate 428 of the twin diode 382, while the other end of the test coil 372 is connected to a plate 429 of the twin diode 382. The tube 382 has a cathode 430 associated with the plate 428 and connected through the parallel combination of a resistor 431 and a capacitor 432 to the junction point 426 and has a cathode 433 associated with the plate 429 and connected through the parallel combination of a resistor 434 and a capacitor 435 to the junction point 426. Unidirectional voltages are developed across the resistors 431 and 434 which are of opposite polarity and which correspond to the alternating reference voltage across the inductance 381 and the alternating voltage across the test coil 372, respectively.

The direct current amplifier 383 comprises a twin triode vacuum tube 436 having grids 437 and 438 connected to the cathodes 433 and 430, respectively, of the tube 482 and also connected through resistors 439 and 440 to ground. The tube 436 also has a pair of cathodes 441 and 442 connected together and through a resistor 443 to ground and a pair of plates 444 and 445 connected through resistors 446 and 447, respectively, to opposite ends of a potentiometer 448 having a center tap 449 connected to a source of high positive potential with respect to ground such as battery 449a. The meter 384 is connected in series with a switch 450 and a variable resistor 451 to the plates 444 and 445 and thus indicates any difference in the relative potential of the two plates. If desired, capacitors 452 and 453 may be connected between ground and the plates 444 and 445, respectively.

It should be noted that instead of calibrating the meter 384 the reference voltage may be adjusted to obtain a null indication in the meter 384, and the means used to adjust the reference voltage may be calibrated in terms of conductivity. For example, the capacitor 425 may be used to adjust the reference voltage and may be calibrated. It should also be apparent from the foregoing that the circuit of Figure 6 may be adjusted to operate below the resonant frequency and may then be used to measure coating thickness. Likewise, the circuit of Figure 5 may be adjusted to operate above the resonant frequency and may then be used to measure conductivity.

It will be understood that modifications and variations may be effected without departing from the spirit and scope of the novel concepts of the present invention.

I claim as my invention:

1. In an instrument including an alternating current-excited test coil arranged to be disposed adjacent a test piece, for measuring changes in a certain characteristic irrespective of changes in another characteristic, one of said characteristics being the conductivity of the test piece, a change in which produces an increase or decrease in both the effective inductive reactance and effective resistance of the test coil and the other characteristic being the effective spacing between the test coil and the test piece, a change in which produces an increase in effective inductive reactance or resistance while producing a decrease in the other, capacitance means connected in circuit with said coil to form a resonant circuit, an alternating current source connected to said circuit, and means for measuring an output voltage developed in a portion of said circuit, said resonant circuit having a nominal resonant frequency differing to a predetermined degree from the frequency of said source such that a change in the output voltage produced by a shift in resonant frequency from a change in inductive reactance balances out a change in output voltage produced by a change in the effective resistance, such changes in inductive reactance and effective resistance being produced by a change in said another characteristic.

2. An instrument as defined in claim 1 for measuring changes in conductivity independently of changes in the effective spacing between the test coil and the test piece, in which said nominal resonant frequency is less than the frequency of said alternating current source.

3. An instrument as defined in claim 1 for measuring changes in the effective spacing between the test coil and the test piece independently of changes in the conductivity of the test piece, and in which said nominal resonant frequency is higher than the frequency of said source.

4. In a method of testing by means of a test coil connected in circuit with a capacitor to form a resonant circuit connected to an alternating current source with means for measuring an output voltage developed across a portion of the circuit, to measure a change in a certain characteristic independently of changes in another characteristic, one of said characteristics being the conductivity of a test piece, a change in which produces an increase or decrease in both the effective inductive reactance and the effective resistance of the test coil and the other characteristic being the effective spacing between the test coil and the test piece, a change in which produces an increase in effective inductive reactance or resistance while producing a decrease in the other, the step of relatively adjusting the frequency of the alternating current to a predetermined frequency different from the nominal resonant frequency of the resonant circuit at which a change in the output voltage produced by a shift in the resonant frequency due to a change in the inductive reactance in response to a change in said another characteristic balances out a change in the output voltage produced by a change in the effective resistance in response to said change in said another characteristic.

References Cited in the file of this patent
UNITED STATES PATENTS

| | | |
|---|---|---|
| 2,222,221 | Burford | Nov. 19, 1940 |
| 2,372,056 | Broding | Mar. 20, 1945 |
| 2,587,631 | Kuehne | Mar. 4, 1952 |